(12) United States Patent
Francis

(10) Patent No.: US 6,978,358 B2
(45) Date of Patent: Dec. 20, 2005

(54) EXECUTING STACK-BASED INSTRUCTIONS WITHIN A DATA PROCESSING APPARATUS ARRANGED TO APPLY OPERATIONS TO DATA ITEMS STORED IN REGISTERS

(75) Inventor: Hedley James Francis, Newmarket (GB)

(73) Assignee: ARM Limited, Cambridge (GB)

( * ) Notice: Subject to any disclaimer, the term of this patent is extended or adjusted under 35 U.S.C. 154(b) by 702 days.

(21) Appl. No.: 10/113,942

(22) Filed: Apr. 2, 2002

(65) Prior Publication Data

US 2003/0188128 A1  Oct. 2, 2003

(51) Int. Cl.⁷ .................................................. G06F 9/00
(52) U.S. Cl. ...................................... 712/202; 712/220
(58) Field of Search ............................. 712/202, 220, 712/225; 711/132, 135

(56) References Cited

U.S. PATENT DOCUMENTS

| 5,634,118 A | * | 5/1997 | Blomgren | .................... 712/226 |
| 5,687,336 A | * | 11/1997 | Shen et al. | .................. 712/202 |
| 6,332,215 B1 | * | 12/2001 | Patel et al. | .................. 717/141 |

* cited by examiner

*Primary Examiner*—Henry W. H. Tsai
(74) *Attorney, Agent, or Firm*—Nixon & Vanderhye P.C.

(57) ABSTRACT

A data processor comprises a register bank containing a plurality of "n" bit registers for storing data items, a set of registers within the register bank being allocatable to hold stack data items from a portion of the stack, and each register in the set storing as an n-bit value stack data items of the first or second type. An arithmetic logic unit executes operations upon data items held in the registers and a decoder decodes a stack-based instruction to specify a number of operations to be executed by the arithmetic logic unit upon one or more stack data items held in predetermined registers in the set. Further, a stack controller is arranged to control movement of stack data items between the stack and the set of registers, and is responsive to the decoder causing one or more stack data items to be held in the predetermined registers.

40 Claims, 4 Drawing Sheets

| JAVACARD INST^N | CONTROL SIGNALS ISSUED | REGISTER IDs ISSUED | R1 V | R1 S | R1 CONTENT | R2 V | R2 S | R2 CONTENT | R3 V | R3 S | R3 CONTENT | R4 V | R4 S | R4 CONTENT |
|---|---|---|---|---|---|---|---|---|---|---|---|---|---|---|
| iadd | LOAD tos + tos-1 INTO A | A = REG 1 | ✓ | 1 | tos + tos-1 | ✗ | | | ✗ | | | ✗ | | |
|  | LOAD tos-2 + tos-3 INTO A | A = REG 2 | ✓ | 1 | tos + tos-1 | ✓ | 1 | tos-2 + tos-3 | ✗ | | | ✗ | | |
|  | ADD A AND B, PUT RESULT IN C | A = REG1, B = REG2, C = REG1 | ✓ | 1 | tos + tos-1 | ✗ | | | ✗ | | | ✗ | | |
| iadd | LOAD tos-2 + tos-3 INTO A | A = REG 2 | ✓ | 1 | tos + tos-1 | ✓ | 1 | tos-2 + tos-3 | ✗ | | | ✗ | | |
|  | ADD A AND B, PUT RESULT IN C | A = REG1, B = REG2, C = REG1 | ✓ | 1 | tos + tos-1 | ✗ | | | ✗ | | | ✗ | | |
| iconst_1 | LOAD CONST 1 INTO A | A = REG 2 | ✓ | 1 | tos-2 + tos-3 | ✓ | 1 | tos + tos-1 | ✗ | | | ✗ | | |
| iload_0 | LOAD LOCAL VAR 0 INTO A | A = REG 3 | ✓ | 1 | tos-4 + tos-5 | ✓ | 1 | tos-2 + tos-3 | ✓ | 1 | tos + tos-1 | ✗ | | |
| sconst_3 | LOAD CONST 3 INTO A | A = REG 4 | ✓ | 1 | tos-5 + tos-6 | ✓ | 1 | tos-3 + tos-4 | ✓ | 1 | tos-1 + tos-2 | ✓ | 0 | tos |
| sload_1 | FLUSH A TO STACK | A = REG 1 | ✗ | 0 | tos | ✓ | 1 | tos-3 + tos-4 | ✓ | 1 | tos-1 + tos-2 | ✓ | 0 | tos |
|  | LOAD LOCAL VAR 1 INTO A | A = REG 1 | ✓ | | | ✓ | 1 | tos-4 + tos-5 | ✓ | 1 | tos-2 + tos-3 | ✓ | 0 | tos-1 |

Fig. 4

EXECUTING STACK-BASED INSTRUCTIONS WITHIN A DATA PROCESSING APPARATUS ARRANGED TO APPLY OPERATIONS TO DATA ITEMS STORED IN REGISTERS

BACKGROUND OF THE INVENTION

1. Field of the Invention

The present invention relates to the field of data processing systems. More particularly, the present invention relates to the execution of stack-based instructions within a data processing apparatus arranged to apply operations to data items stored in registers.

2. Description of the Prior Art

One class of instruction sets includes those instruction sets that use a stack-based approach to storing and manipulating data items upon which they act. The stack within a data processing system supporting such a stack-based instruction set may store a sequence of data items, for example operand values, that are placed into the stack in a particular order and then removed from the stack in the reverse of that order. Thus, the last data item to be placed into the stack will also typically be the first data item to be removed from the stack. Stack-based processors may provide a stack consisting of a plurality of addressable stack entries to which data items may be written and from which data items may be read in conjunction with a stack pointer which indicates the current "top" position within the stack. The stack pointer specifies a reference point within the stack memory which identifies the latest data item to be stored into the stack and from which other accesses to the stack may be referenced.

One example of a stack-based instruction set is the Java Virtual Machine instruction set as specified by Sun Microsystems Inc. The Java programming language seeks to provide an environment in which computer software written in Java can be executed upon many different processing hardware platforms without having to alter the Java software. Another example of a stack-based instruction set is the Java Card instruction set as specified by Sun Microsystems Inc., which is a version of Java which has been designed for use within smart cards and similar devices, i.e. devices which are relatively cheap and consume relatively low power.

Another class of instruction sets includes those instruction sets that use a register-based approach to storing and manipulating the data items upon which they act. An example of such register-based systems are the ARM processors produced by ARM Limited of Cambridge, England. ARM instructions execute operations (such as mathematical manipulations, loads, stores, etc) upon operands stored within registers of the processor specified by register fields within the instructions.

It is becoming more desirable for data processing systems designed to execute register-based instructions to support execution of stack-based instructions. An example of such a data processing system is described in UK patent application no. 0024404.6. As described in that patent application, stack-based instructions are converted into a sequence of operations to be executed by the processor core upon registers within a register bank. The data items on the stack that are required by those operations are stored from the stack into registers of the register bank so that they are available to the processor core. Typically, a set of registers within the register bank are allocated to hold stack data items (also referred to herein as stack operands) from a portion of the stack. As described in that patent application, in order to efficiently use the registers allocated to stack operands, a plurality of different mapping states are provided in which different registers within the set hold respective stack operands from different positions within the portion of the stack. The mapping state is changed in dependence upon operations that add or remove stack operands held within the set of registers used for the stack in a manner that provides a function similar to that of a stack pointer within a stack. This approach reduces the processing overhead required to provide stack-like storage within the registers of a register-based processor.

In the system described in UK patent application no. 0024404.6, each of the stack entries in the stack is considered to be of a fixed size, and each register in the set of registers allocated to hold stack operands is arranged to only store the data corresponding to one stack entry. However, it will be appreciated that the registers of the processor core that may be devoted to the storage of stack operands is limited by the need to provide other registers for functions such as the management of the decoding of the stack-based instructions into operations to be executed within the register-based processor, and for the emulation of other control values, such as a variables pointer or a constant pool pointer, that may be found in a stack-based processing system. This means that situations may arise where stack operands held within the set of registers may need to be moved back to the stack to provide room for new stack operands to be placed within the set of registers.

Accordingly, it will be desirable to provide techniques which enable more flexible use of the set of registers allocated for the storage of stack operands.

SUMMARY OF THE INVENTION

Viewed from a first aspect, the present invention provides a data processing apparatus for executing stack-based instructions specifying operations to be executed upon stack data items held in a stack, a first type of stack data item having a first size, and a second type of stack data item having a second size, the data processing apparatus comprising: a register bank containing a plurality of 'n' bit registers for storing data items, a set of registers within said register bank being allocatable to hold stack data items from a portion of the stack, each register in said set being able to store as an 'n' bit value a stack data item of said first type or a stack data item of said second type; an arithmetic logic unit for executing operations upon data items held in said registers; a decoder for decoding a stack-based instruction to specify a number of operations to be executed by the arithmetic logic unit upon one or more stack data items held in predetermined registers in said set; a stack controller for controlling the movement of stack data items between the stack and the set of registers, and responsive to the decoder to cause the one or more stack data items to be held in the predetermined registers; the stack controller being arranged to cause an indication of the size of each stack data item held in registers within said set to be maintained, such that when one of those stack data items is moved from the set of registers to the stack, the stack controller can cause that stack data item to be stored on the stack at the size defined by its type.

In accordance with the present invention, it has been realised that there are a number of stack-based instruction sets that are arranged to perform operations on stack data items of different sizes, and that the registers within the register bank may be of a size sufficient to store either a stack data item of a first type or a stack data item of a second type, where the first and second types are of different sizes. Hence, it was considered desirable to seek to provide a technique which would enable each register to no longer be constrained to only store a data chunk of one fixed size retrieved from the stack (e.g. a data chunk corresponding to the data in one stack entry), so as to facilitate more efficient and flexible use of the available registers. However, whilst the type of the stack data item is often known at the time that data item is placed into a register, since that action takes place in connection with the execution of a particular stack-based instruction which will typically have identified the type of data upon which it is acting, that type information is not available when the stack data item held in a particular register subsequently needs to be moved to the stack to provide room within the set of registers for new stack data items, and accordingly this would appear to preclude the possibility of introducing flexibility with regard to the size of data placed within any particular register.

However, in accordance with the present invention, this problem has been solved by arranging the stack controller that is provided for controlling the movement of stack data items between the stack and the set of registers, such that it causes an indication of the size of each stack data item held in registers within said set to be maintained. By maintaining this data, it is then possible when one of those stack data items is moved from the set of registers to the stack, to cause the stack data item to be stored on the stack such that that stack data item has the correct size appropriate to its type.

Thus, the maintenance of this size indication within the data processing apparatus allows each register in the set allocated for holding stack data items to store stack data items of differing sizes. Hence, as an example, if a stack data item of the first type fills one stack entry, and a stack data item of the second type is twice as big as a stack data item of the first type (and hence fills two stack entries), but each register is large enough to store either type of stack data item, then a stack data item of the second type can be stored within a single register, whereas previously it would typically have been stored within two registers, each register of such a previous system being constrained to store a chunk of data from the stack that has a size corresponding to the size of the first type stack data item. This also improves the efficiency of operations which operate on the second type of stack data item as it is now stored in a single register, rather than over two separate registers.

It will be appreciated by those skilled in the art that the indication of the size of each stack data item held in registers within said set could be maintained in a variety of forms. However, in preferred embodiments, these size indications are stored as a plurality of state bits. Preferably, predetermined state bits are associated with corresponding registers, and are set so as to give an indication of the size of the stack data item held in the corresponding register. In preferred embodiments, there are two possible sizes for stack data items, and the plurality of state bits comprise one bit per register within said set, each bit being arranged to specify whether the corresponding register contains a stack data item of the first type or the second type.

It should be noted that whilst in preferred embodiments there are only two possible sizes for the stack data items, this does not necessarily mean that there will only be two types of stack data item. For example, considering the example of the Java Card instruction set, there are a number of types of stack data item, including "byte", "short" and "int". The "byte" type of stack data item is expressed as 16 bits on the stack (even though it only represents in reality an 8 bit value), and the "short" type of stack data item is also 16 bits in length. However, the "int" type of stack data item is actually 32 bits in length, this being represented by two 16 bit stack entries on the stack. In accordance with preferred embodiments of the present invention, all of these types of stack data item can be stored within a single register of the register bank, whereas prior to the present invention it would have been necessary to use two registers to store an "int" type of stack data item.

In addition to storing state bits providing an indication of the size of each stack data item held in the set of registers, the data processing apparatus of preferred embodiments further comprises additional state bits indicative of a number of valid stack data items held within said set of registers and indicative of which register within said set holds a top of stack data item.

It will be appreciated by those skilled in the art that the indication of the size of each stack data item held in the set of registers can be maintained at any appropriate location within the data processing apparatus. However, in preferred embodiments, the indication of the size of each stack data item held in registers within said set is maintained by the stack controller within a block of memory. Since the stack controller is responsible for the movement of stack data items between the stack and the set of registers, and the size indication information is used in the control of that process, it has been found to be particularly efficient to ensure that that size indication information is maintained directly by the stack controller within a local piece of memory accessible by that stack controller.

It will be appreciated by those skilled in the art that the stack could be provided with various different hardware arrangements. However, in preferred embodiments, the stack comprises a plurality of addressable stack entries, each entry having a fixed size of "m" bits. An addressable memory is frequently found within processing systems together with mechanisms such as sophisticated cache memories for enabling high speed access to the data within such an addressable memory. In such preferred embodiments where the stack comprises a plurality of addressable stack entries each of "m" bits, the first type of stack data item preferably has a size of "m" bits, and the second type of stack data item has a size which is a multiple of "m" bits.

More particularly, in preferred embodiments, the second type of data item has a size of 2m bits.

It will be appreciated by those skilled in the art that there is no requirement for there to be any correspondence between the value "m" and the value "n" identifying the number of bits in each register, provided that the register is large enough to store a stack data item of the first type or a stack data item of the second type. When these stack data items are placed within the register, they are all represented as an n-bit value irrespective of whether they are stack data items of the first type or stack data items of the second type.

However, whilst there is no requirement for there to be any correspondence between "m" and "n", in preferred embodiments n=2m. In particularly preferred embodiments, m=16.

It will be appreciated that the stack-based instructions executed by the data processing apparatus could be from any appropriate stack-based instruction set. In preferred embodiments, the stack-based instructions are Java Card instructions. Java Card specifies that the stack entries of the stack should all be of the same size, with each stack entry being 16 bits or more. Typically, the stack entries are 16 bits in length. In such preferred embodiments, the registers within the register bank are preferably 32 bit registers. However, it will be appreciated that the present invention is also applicable to other stack-based instruction sets, for example the Java instruction set. Java specifies that the stack entries of the stack should all be of the same size, with each entry being of 32 bits or more. Typically, in Java, each stack entry is 32 bits in length. In embodiments based on the Java instruction set, embodiments of the present invention could be used if the register bank contains registers which are at least 64 bits in length.

In preferred embodiments of the present invention, the first size is such that each register in said set is able to store a plurality of the first type of stack data items, the stack controller being arranged, for each register in said set that stores a first type data item, to cause an indication of the number of first type data items stored in that register to be maintained. By this approach, it is further possible to improve the efficiency of use of the set of registers allocated for the storage of stack operands, since more data items can be cached within the set of registers.

It will be appreciated that this approach could also be taken for the second type of stack data item, assuming that multiple of those data items could be stored within a single register. However, in preferred embodiments, only one second type data item can be stored within a single register. In preferred embodiments, the second type data item will be stored in a single register, rather than split between more than one register, and a register containing a second type data item will not at the same time store any additional types of data item therein.

In preferred embodiments, the indication of the number of first type data items held in any register in said set is stored as a plurality of state bits. It will be appreciated that separate dedicated state bits may be provided for this purpose, or the number indication may alternatively be encoded within a plurality of state bits that also encode other state information.

As mentioned earlier, in preferred embodiments, the stack comprises a plurality of addressable stack entries having a fixed size of 'm' bits, the first type of stack data item having a size of 'm' bits, and the second type of stack data item having a size which is a multiple of 'm' bits.

In such embodiments, preferably n=2m, and the indication of the number of first type data items stored in a particular register in said set is provided by one or more state bits identifying which halves of said register contain valid data.

It will be appreciated that the data processing apparatus may be arranged solely to execute stack-based instructions, or alternatively could be arranged to execute either stack-based instructions or register-based instructions. In preferred embodiments, the stack-based instructions are from a first, stack-based, instruction set, and the data processing apparatus is additionally operable to execute register-based instructions from a second, register-based, instruction set, the data processing apparatus further comprising an additional decoder for decoding a register-based instruction to specify a number of operations to be executed by the arithmetic logic unit upon one or more data items held in predetermined registers of said register bank.

In such preferred embodiments, the second instruction set preferably includes a swap instruction which when executed causes processing to swap from the second instruction set to the first instruction set, at which time said set of registers within said register bank are allocated to hold stack data items from a portion of the stack. Accordingly, whilst the data processing apparatus is executing the second instruction set, the set of registers within the register bank are not reserved for holding stack data items, but instead can be used during the processing of the register-based instructions of the second instruction set, the set of registers only being allocated to hold stack data items when the processing swaps to the first instruction set.

In a similar fashion, in preferred embodiments the first instruction set includes a swap instruction which when executed causes processing to swap from the first instruction set to the second instruction set, when instructions of the first instruction set are being executed, the indication of the size of each stack data item held in registers within said set being stored as a plurality of state bits, and on execution of the swap instruction the stack controller being arranged to cause said plurality of state bits to be stored to a predetermined register within said bank of registers. Hence, when the processing swaps from the first instruction set to the second instruction set, the plurality of state bits are stored to a predetermined register. This ensures that when the processing subsequently swaps back to the first instruction set, those state bits are available, thereby enabling an assessment of the initial state of the set of registers.

In some transitions from the first instruction set to the second instruction set, it may be appropriate that each stack data item held in the set of registers is first stored onto the stack, in which event the plurality of state bits stored to the predetermined register will indicate that all of the registers are empty. However, some swaps between the instruction sets are of a very temporary nature, such as may be induced by an interrupt, and in such situations there is not considered the time to store each stack data item back to the stack, and in such situations the storing of the plurality of state bits to the predetermined register ensures that the state of the various registers when the process subsequently swaps back to the first instruction set can be readily determined.

Whilst it will be appreciated that the set of registers could hold stack data items from any position within the stack, it is strongly desirable that the set of registers store a top portion of the stack including a top of stack data item. Stack-based processing systems most often access stack data items that were only recently stored to the stack and accordingly keeping these stack data items within the registers where they may be rapidly accessed is strongly advantageous. Furthermore, having the top of stack data item held within the registers makes the ability to move between different mapping states highly advantageous as the top of stack data item will often change as stack data items are pushed to the stack or popped from the stack.

It will be appreciated that there are a number of different criteria that could be used to determine when to move a stack data item from the set of registers to the stack. However, in preferred embodiments, the stack controller is arranged to move a stack data item from said set of registers to the stack if the number of registers within said set that need to be available prior to execution of the number of operations specified by the decoder is more than the number of currently available registers in said set. Hence, as an example, if the stack-based instruction to be executed is one which results in a net increase in the number of stack data items, it will typically require at least one free register within the set in order to store the additional stack data item. If all of the registers currently contain a stack data item prior to the execution of this stack-based instruction, then it is appropriate for one or more of those stack data items to be moved to the stack to free up the required number of registers. This criteria for deciding when to move stack data items from the registers to the stack has been found to be particularly efficient, since it ensures that the stack data items are only moved to the stack when absolutely necessary.

It will be appreciated that the decoder and/or the stack controller could take a variety of forms. In particular, the decoder could be provided as a special purpose hardware for decoding or compiling the stack-based instructions, or as software controlling the data processing apparatus to perform similar decoding or compilation functions. A mix of approaches may also be usefully employed.

In particular, a hardware decoder may be provided to achieve high speed decoding of simple frequently occurring instructions within the stack-based instruction set, whilst software decoding may be used for complex or infrequently occurring instructions of the stack-based instruction set which are such that the hardware overhead of providing such decoding would not be practical or efficient.

Viewed from a second aspect, the present invention provides a method of operating a data processing apparatus to execute stack-based instructions specifying operations to be executed upon stack data items held in a stack, a first type of stack data item having a first size, and a second type of stack data item having a second size, the data processing apparatus comprising a register bank containing a plurality of 'n' bit registers for storing data items, a set of registers within said register bank being allocatable to hold stack data items from a portion of the stack, each register in said set being able to store as an 'n' bit value a stack data item of said first type or a stack data item of said second type, and the data processing apparatus further comprising an arithmetic logic unit for executing operations upon data items held in said registers, the method comprising the steps of: (i) decoding a stack-based instruction to specify a number of operations to be executed by the arithmetic logic unit upon one or more stack data items held in predetermined registers in said set; (ii) controlling the movement of stack data items between the stack and the set of registers, so as to be responsive to said step (i) to cause the one or more stack data items to be held in the predetermined registers; (iii) maintaining an indication of the size of each stack data item held in registers within said set, such that if at said step (ii) a stack data item is moved from the set of registers to the stack, that stack data item is stored on the stack at the size defined by its type; and (iv) executing said number of operations specified at said step (i).

Viewed from a third aspect, the present invention provides a computer program product carrying a computer program for controlling a computer to perform the method in accordance with the second aspect of the present invention.

BRIEF DESCRIPTION OF THE DRAWINGS

The present invention will be described further, by way of example only, with reference to a preferred embodiment thereof as illustrated in the accompanying drawings, in which:

FIG. 4 is a table illustrating the steps taken during the execution of a sequence of Java Card instructions upon the Arithmetic Logic Unit of FIG. 1.

DESCRIPTION OF A PREFERRED EMBODIMENT

Figure 1:
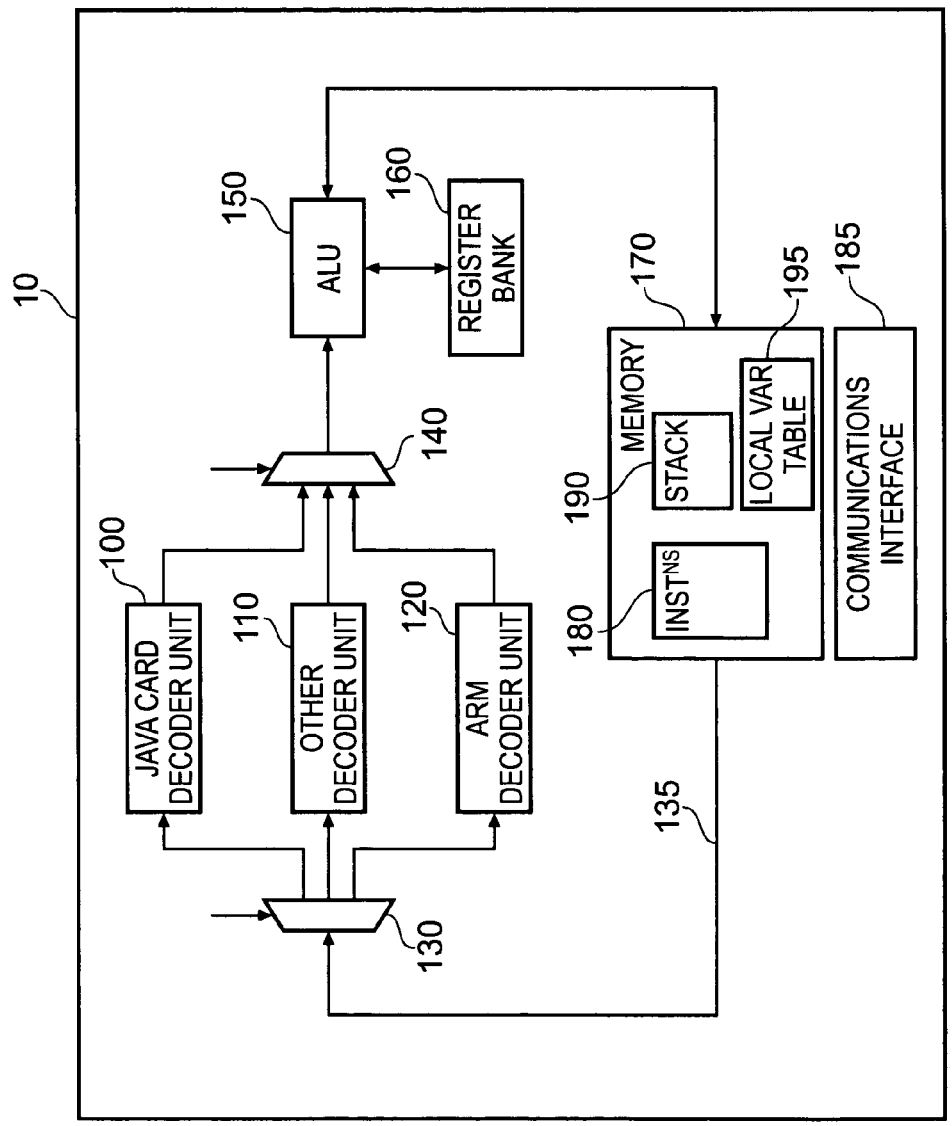
FIG. 1 is a block diagram of a data processing apparatus in accordance with a preferred embodiment of the present invention.

FIG. 1 is a block diagram illustrating a data processing apparatus 10 in accordance with a preferred embodiment of the present invention. The data processing apparatus 10 may be any apparatus arranged to execute stack-based instructions within a register-based system. However, in preferred embodiments, the data processing apparatus is a smart card. As will be appreciated by those skilled in the art, smart cards are typically issued to individuals or organisations, and are arranged to perform a variety of data processing operations as dictated by a data processing system with which they are intended to interface. For example, a smart card in the form of a bank credit/debit card may be issued to an individual, and may be arranged when inserted into a bank cash machine to perform a variety of functions as dictated by the bank cash machine. As another example, a smart card may be issued to a user of a cable or satellite television service, for inserting into a decoder unit. The smart card can be interrogated by the decoder unit to provide relevant details about the user, for example the services subscribed to, credit limits, etc.

Accordingly, to enable the smart card 10 to communicate with a data processing system with which it is intended to be coupled, the smart card 10 is provided with a communications interface 185, for example a serial interface, for facilitating the exchange of data between the smart card 10 and such a data processing system. Power for the smart card will also typically be received via this interface. However, as will be appreciated by those skilled in the art, the interface need not be a contact-based interface such as that described above, but could alternatively be a contactless interface, for example with a coil that both generates the power and carries the information).

An instruction, for example a load instruction, provided within the memory 170, may be periodically executed by the arithmetic logic unit (ALIU) 150 in order to periodically poll the communications interface 185 in order to determine what functions the smart card 10 is being requested to perform. For example the load instruction may specify an address of a peripheral. As will be discussed in more detail later, the data processing apparatus may be arranged to execute not only stack-based instructions, but also register-based instructions, and in preferred embodiments, the above load instruction would be from the register-based instruction set.

A plurality of instructions 180 are provided within the memory 170 to enable the smart card 10 to perform the required functions. Accordingly, as dictated by the signals received over the communications interface 185 from a data processing system to which the smart card 10 is coupled, smart card 10 will retrieve instructions 180 from the memory 170 and route them over path 135 via the multiplexer 130 to an appropriate decoder unit 100, 110, 120. The instructions 180 stored within the memory 170 will belong to one or more instruction sets. In the embodiment illustrated in FIG. 1, it is envisaged that the instructions 180 may belong to one of three instruction sets, namely an ARM instruction set, the Java Card instruction set, or some other instruction set. Instructions from the ARM instruction set are register-based instructions which will be routed via the multiplexer 130 to the ARM decoder unit 120. The ARM decoder unit 120 would then decode an ARM instruction to generate one or more operations for routing via the multiplexer 140 to the ALU 150, where those one or more operations will be executed upon operands stored within registers of the register bank 160.

In contrast to ARM instructions, Java Card instructions are stack-based instructions which are intended to be executed upon data items stored within a stack 190 within the memory 170. However, in accordance with preferred embodiments of the present invention, the Java Card decoder unit 100 is arranged to receive from the multiplexer 130 any Java Card instructions, and is arranged to decode those Java Card instructions to specify a number of operations to be executed by the ALU 150 upon one or more stack data items (also referred to as stack operands) that have been moved from the stack 190 into the register bank 160 for access by the ALU 150. This process will be discussed in more detail later with reference to FIGS. 2 to 4.

The additional decoder unit 110 is provided in FIG. 1 to illustrate that one or more additional decoder units could be provided if it is intended for the smart card 10 to be able to also execute instructions from one or more further instruction sets. As an example of a further instruction set that may be supported by the smart card 10, the smart card 10 could be arranged to execute Thumb instructions from the Thumb instruction set developed by ARM Limited of Cambridge, England. Thumb instructions, like ARM instructions, are register-based instructions, and accordingly the decoder unit 10 will be arranged to decode such Thumb instructions in order to generate one or more operations for execution by the ALU 150 upon operands stored within registers of the register bank 160. In addition to, or as an alternative to, supporting an additional register-based instruction set, the smart card 10 could also be arranged to support an additional stack-based instruction set, in which event the other decoder unit 110 would be arranged to decode an instruction from that other stack-based instruction set in order to specify a number of operations to be executed by the ALU 150 upon stack operands retrieved into the register bank 160 from an additional stack within the memory 170.

As with any stack-based instruction set, the data items required by the various Java Card instructions are typically stored within a stack 190. However, as mentioned previously, stack-based systems require the data items to be placed into the stack in a particular order and then removed from the stack in the reverse of that order, and accordingly the last data item to be placed into the stack will also typically be the first data item to be removed from the stack. Accordingly, it may not be possible from the outset to place within the stack 190 all of the data items required, and accordingly a table of local variables 195 is also typically provided to store particular data items that may be required at certain points during the execution of a sequence of Java Card instructions. When any of the data items stored within the table of local variables 195 are required, they are first loaded onto the stack 190 (or stored into the portion of the stack maintained within the register bank 160 as discussed in more detail later).

Figure 2:
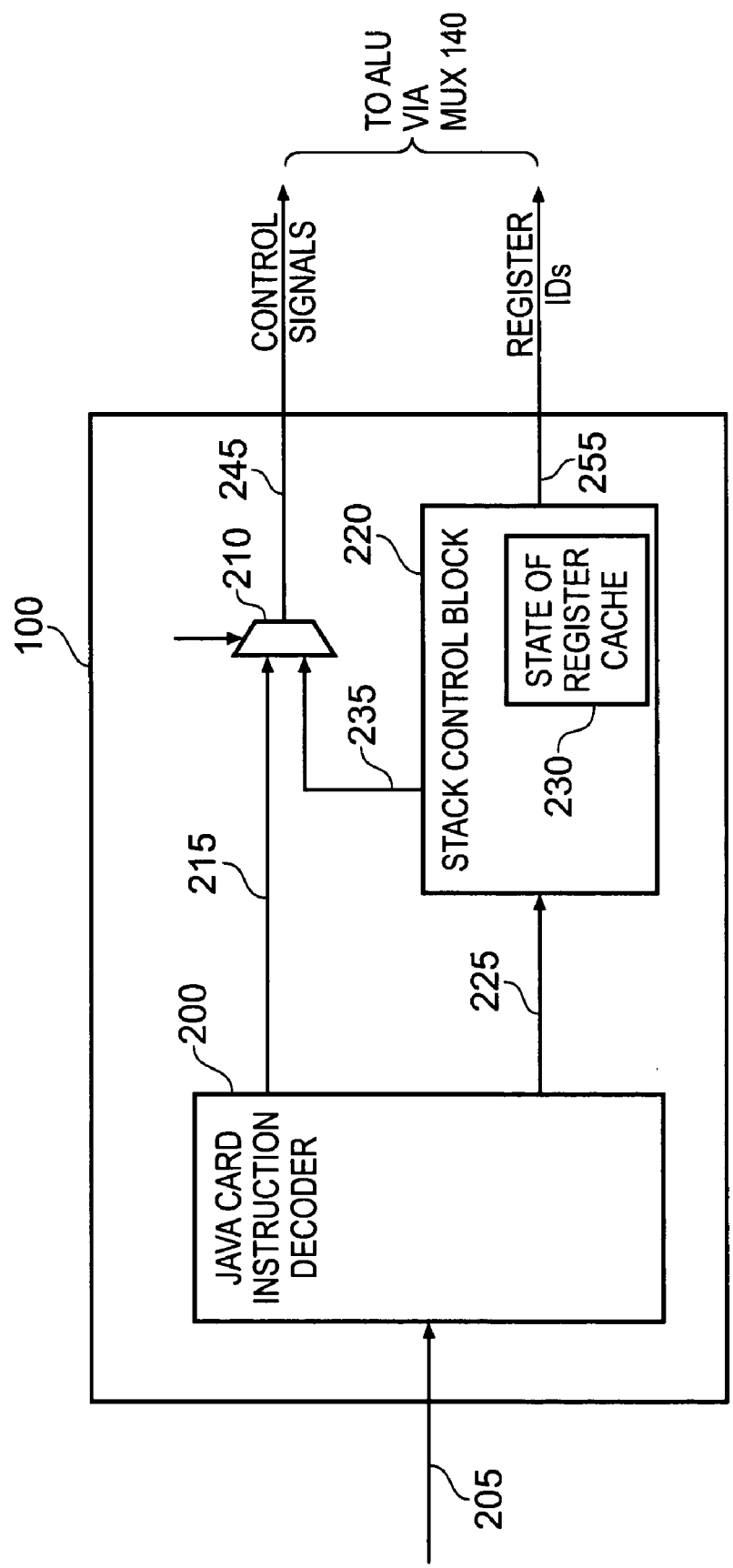
FIG. 2 is a block diagram illustrating in more detail the elements provided within the Java Card decoder unit 100 of FIG. 1.

FIG. 2 is a block diagram illustrating in more detail the components provided within the Java Card decoder unit 100 of FIG. 1. As shown in FIG. 2, any Java Card byte code instructions are routed over path 205 from the multiplexer 130 to a Java Card instruction decoder 200 within the Java Card decoder unit 100. This will result in the generation of control signals over path 215 to the multiplexer 210 specifying one or more operations to be executed by the ALU 150. In addition, signals will be sent over path 225 to the stack control block 220 to indicate what stack data items are required in order to perform those operations, along with other related information such as whether each operation will result in a net increase or a net decrease in the number of stack data items.

Since the ALU 150 can only execute operations upon data items stored within the register bank, and cannot perform operations directly on data items stored within the stack 190, it is necessary prior to execution of an operation specified by the instruction decoder 200 over path 215 to first ensure that the required data items have been moved from the stack 190 into the register bank 160, and to ensure that there is sufficient space within the register bank 160 to store any new stack data items generated as a result of executing that operation.

Figure 3:
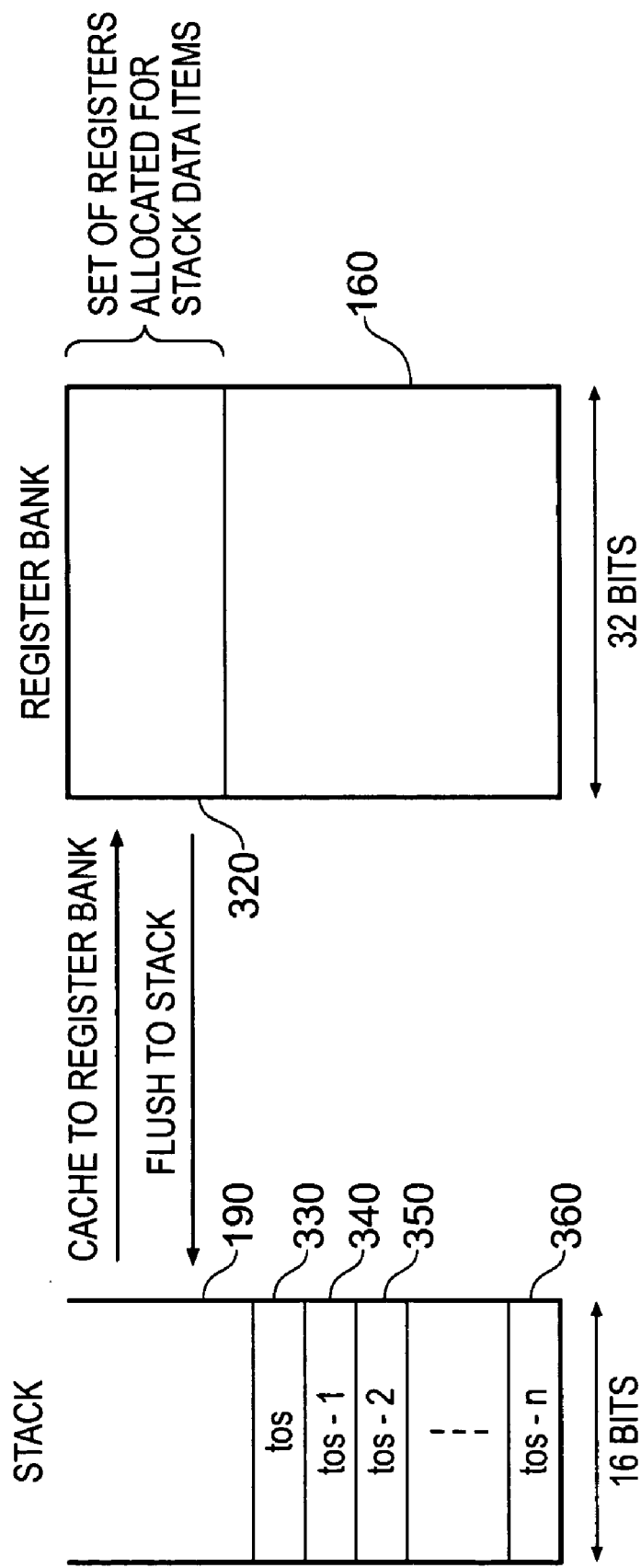
FIG. 3 is a diagram schematically illustrating the stack and register bank used in preferred embodiments of the present invention.

FIG. 3 is a block diagram illustrating both the stack 190 and the register bank 160 and illustrating the movement of stack data items between the stack 190 and the register bank 160. In preferred embodiments, the stack 190 consists of a plurality of addressable stack entries, each of 16 bits in length. As data items are placed on the stack, a stack pointer is incremented so as to point to the uppermost entry in the stack containing a data item. That entry is referred to as the "top of stack" (tos) 330, the stack entry 340 below that is referred to as "tos-1", the stack entry 350 below that is referred to as "tos-2", etc. It will be appreciated that as each new data item is placed into the stack, the stack pointer is moved, and accordingly the reference associated with any particular stack entry will change.

Java Card specifies a number of types of stack data item that may be stored within the stack, including "byte", "short" and optionally "int" (i.e. integer). The "byte" type of stack data item is expressed as 16 bits on the stack (even though it only represents in reality an 8 bit value), and accordingly will be stored within one stack entry. The "short" type of stack data item is 16 bits in length, and hence will also be stored within a single stack entry. However, the "int" type of stack data item is 32 bits in length, and accordingly such a data item will be stored in two adjacent stack entries.

As mentioned, the ALU 150 cannot directly manipulate any data item stored on the stack, and accordingly any data items required from the stack must first be moved from the stack to a set of registers 320 within the register bank 160. This set of registers 320 is also referred to herein as the register cache, since it is a portion of the register set aside for caching stack data items. In preferred embodiments, each register is a 32-bit register. Typically, the set of registers forming the register cache will only be a relatively small subset of the overall number of registers within the register bank, for example four registers out of sixteen provided within the register bank. As mentioned earlier, the number of registers that may be devoted to the storage of stack data items is limited by the need to provide other registers for functions such as the management of the decoding of the stack-based instructions into operations to be executed within the register-based ALU, and for the emulation of other control values, such as a variables pointer or a constant pool pointer, that may be found in a stack-based processing system.

Prior to the present invention, each register within the register cache 320 was arranged to store the data from a single stack entry on the stack. This ensured a simple correspondence between the data stored in a particular register and the data stored within a particular stack entry, such that when it subsequently became necessary to move a data item in a particular register back to a stack entry on the stack in order to free up space within the register cache (such an action being referred to hereafter as "flushing" a data item to the stack), it was predetermined that the register would only contain a single stack entry's worth of data. However, such an approach does not allow for efficient use of the registers within the register cache 320, and also means that particular data items to be manipulated by the ALU may not be contained within a single register (for the example of an "Integer" stack data item).

Accordingly, in accordance with preferred embodiments of the present invention, the stack control block 220 of FIG. 2 is arranged based on the information that it receives over path 225 to ensure that the required data items are cached from the stack to the register cache, and to ensure that each register contains a single data item (and hence in the event of an "Integer" stack data item an individual register may store two stack entries' worth of data). A block of memory 230 within the stack control block 220 is arranged to keep a record of which registers within the register cache 320 store which data items. Further, since in accordance with preferred embodiments of the present invention the amount of data stored within a single register will not necessary correspond to a single stack entry's worth of data, it is important that the state of the register cache stored within the memory block 230 also identifies the size of the data item stored within each particular register of the register cache, since this information will subsequently be required when the contents of a particular register are flushed back to the stack.

From the above description, it will be appreciated that prior to the ALU 150 executing any operation specified by the control signals output by the instruction decoder 200 over path 215, it may first be necessary for the stack control block 220 to issue control signals to the ALU 150 to cause it to load into the register cache 320 one or more stack data items from the stack 190, and/or to flush back to the stack one or more data items already held within registers of the register cache 320. This determination is made by the stack control block 220 on the basis of the signals received over path 225, and if appropriate will result in the generation of control signals over path 235 to the multiplexer 210 specifying any such loading or flushing functions to be performed by the ALU 150 before execution of an operation specified by the control signals on path 215.

The multiplexer 210 is then controlled by the stack control block 220 in order to ensure that any control signals issued by the stack control block over path 235 are output onto the control signal path 245 before the corresponding operation specified on path 215 is output over path 245. As each group of control signals is output on path 245, the stack control block 220 will also arrange for the corresponding register IDs to be output on path 255, for example to specify the register(s) into which any data items retrieved from the stack 190 should be placed, the register(s) whose contents are to be flushed back to the stack, or the register(s) whose contents are to be used when executing an operation specified by the instruction decoder 200 over path 215. The signals on paths 245 and 255 are routed via the multiplexer 140 to the ALU 150, where the operation specified by those control signals are executed.

FIG. 4 is a table illustrating for a particular example sequence of Java Card instructions, the control signals issued over path 245, the register ID signals issued over path 255, and the information maintained within the state of the register cache 230. It will be appreciated by those skilled in the art that the particular sequence of instructions illustrated in the table of FIG. 4 is unlikely to occur in reality, since instructions specifying the loading of constants and local variable values onto the stack do not typically occur without an instruction then being issued to manipulate those values. Nevertheless, the sequence of instructions illustrated in FIG. 4 does serve to illustrate at what point a data item is flushed from the register cache 320 back to the stack 190, and how the size information is then used in that flushing process.

At the start of the instruction sequence illustrated by the table of FIG. 4, it will be assumed that all of the registers in the register cache 320 are empty. For the purposes of describing an embodiment of the present invention, it will be considered that four registers are provided within the register cache 320, which are referred to as R1 to R4. It will be appreciated by those skilled in the art that there is no requirement for the register cache 320 to have four registers, and in practice there may be fewer or greater numbers of registers within the register cache. Further, it will be appreciated that there is no requirement for the registers forming the register cache to be consecutive registers within the register blank.

As illustrated in FIG. 4, the first Java Card instruction issued is an "iadd" instruction. An iadd instruction is arranged to add the data item at the top of the stack to the data item that is next in the stack. Since the "i" prefix denotes that the add instruction is to be applied to integer data items, then it will be apparent that the first data item will be stored in the stack entries tos and tos-1, whilst the next data item will be placed in the stack entries tos-2 and tos-3. Since the ALU 150 can only operate on data items stored within the register cache 320, it is first necessary for the stack control block 220 to specify over path 235 two load operations. Accordingly, the multiplexer 210 will issue as a first batch of control signals on path 245 control signals specifying that tos and tos-1 should be loaded into "A", where the corresponding register ID signal issued on path 255 specifies that A denotes register 1. It will be appreciated by those skilled in the art that any of the other registers could instead be specified, this being a matter of design choice.

For each register in the register cache, the memory block 230 maintaining the state of the register cache is arranged to store three pieces of information. Firstly, a valid field (preferably 1 bit) is set to indicate whether the data in that register is valid. Additionally, a size field is provided to keep a record of the size of the data stored within that register. In preferred embodiments, only two sizes are supported, namely 16 bits (for "byte" or "short" data items), or 32 bits (for "int" data items). Accordingly, the size field can be represented as a single bit field, which in preferred embodiments is set to zero to denote a 16 bit data item, or is set to one to indicate a 32 bit data item. The final field associated with each register in the memory 230 is a content field identifying which stack data items are stored within that register. As with stack-based systems, this content information is stored such that it identifies the data relative to the top of stack. Accordingly, after issuance of the first load operation, it can be seen that the state of the register cache is set to indicate that register 1 contains valid 32 bit data which contains tos and tos-1. All of the other registers have their valid bit not set to indicate that they do not contain valid data.

A second load operation is then specified by the stack control block 220, which is issued over path 245 to specify that the contents of tos-2 and tos-3 should be loaded into "A", where the corresponding register ID signal on path 255 specifies that A denotes register 2. The state of the register cache will be updated as shown in FIG. 4 to show that register 2 now contains valid, 32-bit, data containing tos-2 and tos-3. The information for the other three registers remains unchanged.

Having performed the two load operations, the multiplexer 210 can now issue over path 245 the control signals issued by the instruction decoder 200 over path 215, which specify that an add operation should be performed on parameters "A" and "B", with the result being placed in "C". The stack control block 220 is arranged to ensure that the corresponding register ID signals issued over path 255 specify that A denotes register 1, B denotes register 2, and C denotes register 1. Hence, this results in the two 32-bit values stored in registers 1 and 2 being added together, with the result being placed in register 1. The state of the register cache is updated as shown, to indicate that only register 1 now contains valid data, which is 32-bit data containing tos and tos-1 (i.e. the new top of stack and top of stack-1 values).

As shown in FIG. 4, it is assumed that a second "iadd" instruction is then issued. However, since tos and tos-1 are already stored within register 1, it is now only necessary for the stack control block 220 to issue a single load operation prior to the add operation being performed. The state of the register cache after issuance of the load and after issuance of the add operations is illustrated in FIG. 4, again the result being that only register 1 contains valid data, which is 32-bit data representing the new tos and tos-1.

It is then assumed that the next instruction is an iconst_1 instruction, which is a Java Card instruction used to place the constant value "1" on the top of stack. However, rather than placing this value onto the stack, it is instead stored directly into the register cache 320, by issuance of appropriate control signals from the instruction decoder 200 over paths 215 and 245. As register 1 already contains valid data, and there are other registers available, the register ID signal issued on path 255 is used to identify that the constant value 1 should be stored into one of the available registers, on this example register 2. As can be seen by the corresponding state of the register cache, this identifies that the result of this operation will be that the tos and tos-1 are stored in register 2, register 2 containing a 32-bit value, and the data items stored in register 1 are now the tos-2 and tos-3.

The next instruction is assumed to be an iload_0, which is arranged to load the local variable 0 from the table of local variables 195 onto the stack 190. Again, rather than actually moving the local variable 0 onto the stack, it is instead in preferred embodiments moved into one of the registers of the register cache so that it is available for use by the ALU 150. The corresponding register ID signal issued over path 255 with the load operation signals issued on path 245 specifies that the local variable 0 should be stored in register 3. As can be seen from the state of the register cache at this point, the result of this operation will be that register 3 will contain valid, 32-bit bit data, which represents the new tos and tos-1. The entries in register 2 and register 1 now contain tos-2 and tos-3, and tos-4 and tos-5, respectively.

It is then assumed that the next instruction is an sconst_3 instruction, the "s" prefix denoting that this instruction relates to a Short data item (i.e. a 16-bit data item). The decoding of this instruction results in a load operation being issued on path 245 instructing the ALU to load a 16-bit value representing the constant "3" into the register specified on the register ID path 255, in this instance the register specified being register 4 (i.e. the only remaining available register). As can be seen from the corresponding state of register cache entry, the result of this operation will be that register 4 contains a valid 16-bit data item, which is the tos. The other registers also contain valid data items, these data items all being 32-bit data items. Register 3 now contains tos-1 and tos-2, register 2 contains tos-3 and tos-4, and register 1 contains tos-5 and tos-6.

It is then assumed that an sload_1 instruction is issued, this indicating that the local variable 1 (a Short data item) should be put on the stack. However, since this will become the new top of stack value, it is instead loaded into the register cache so that it is available to the ALU 150. However, at this point all of registers contain valid data values, and accordingly prior to loading the local variable 1 into one of the registers, it will first be necessary to flush the contents of one of the registers back to the stack 190. In preferred embodiments, the register containing the data item which is further from the top of stack is the one that is flushed back to the stack, and in this instance this means that the contents of register 1 first need to be flushed back to the stack. Accordingly, control signals are issued by the stack control block over path 245 indicating to the ALU that a flush should take place, and the stack control block 220 is arranged to issue over path 255 a corresponding register ID signal specifying that it is register 1's contents that should be flushed. As can be seen from the corresponding entry in the state of the register cache, this results in the contents of register 1 being marked as invalid, and the contents of registers 2, 3 and 4 remaining unchanged. It is important to note at this point that this single flush operation has resulted in the entire 32-bit data item being flushed back to the cache, this requiring the least significant 16 bits to be placed in the stack entry tos-5, and the most significant 16 bits to be placed in the stack entry tos-6. Since the size information had been retained in the state of the register cache, this flushing operation is simple to achieve, since it is known at the time of flushing that register 1 contains a 32-bit data item (and hence two stack entries' worth of data) rather than a single 16-bit data item.

Once the contents of register 1 have been flushed, it is then possible to load the local variable 1 into register 1, and accordingly a load operation is specified by control signals on path 245, and the corresponding register ID signal on path 255 identifies register 1 as the register into which the Short data item should be loaded. The state of the register cache is then updated as shown to indicate that register 1 contains a valid data item containing the tos. It should be noted that the size information now indicates that there is only a 16-bit data item stored in register 1, rather than the 32-bit data item that was previously stored in register 1. Corresponding changes are made to the information stored in relation to registers 4, 3 and 2 to show that those registers contain tos-1, tos-2 and tos-3, and tos-4 and tos-5, respectively.

Accordingly, by retaining within the state of the register cache 230 maintained by the stack control block 220 valid, size and content information for each of the registers within the register cache, it is possible to store within those registers different size data items, whilst ensuring that those data items can subsequently be flushed back to the stack in the correct manner.

It will be appreciated that there are a number of different ways in which such valid, size and content information could actually be encoded as state bits within the state of the register cache. For example, whilst one state bit is preferably provided per register, the valid and content information for the four registers could be merged into a single sequence of state bits representing different mapping states. For example, such additional state bits may indicate the number of valid stack data items held within the set of registers, and an indication of which register within the set holds the top of stack data item. For example, looking at the table of FIG. 4, the first state entry could be encoded by indicating that there was one valid stack data item held within the registers, and the top of stack entry was in register 1, whilst also specifying a size value indicative of 32-bits for register 1. Similarly, looking at the last entry in FIG. 4, this could be encoded by indicating that there are four valid stack data items held within the set of registers, with register 1 containing the top of stack, and with appropriate size bits then being included with the encoding to specify the sizes of the data items stored in each register. With such an encoding, changes in the state of the register cache can be implemented by transitions between mapping states as encoded in the above manner.

In the above described embodiment, it has been assumed that each register will only store a single stack data item. However, since each register is preferably 32-bits in length, it will be appreciated that it is in principle possible to store two "byte" or "short" type stack data items within a single register in order to improve the efficiency of usage of the registers. To facilitate this, it is necessary to add some additional state bits (or states in a state machine) to clarify, for each register storing a byte or short type data item (rather than an int type data item), which of the two halves of the register contain valid values (i.e. lower 16 bits, upper 16 bits, or both).

From FIG. 4, it will be appreciated that one way of implementing this would be to provide an additional two bits per register within the state of the register cache, that are used, when the corresponding size bit is set to zero, to identify which of the two halves of the register contain valid data. It will however be appreciated that there are other ways of encoding this information, for example by encoding the information within a plurality of state bits that also encode other state information.

When the execution of Java Card instructions is to cease, for example because the instruction flow is to move to a sequence of ARM instructions to be routed via the ARM decoder unit 120 of FIG. 1, then it is typically desirable that the data items held within the register cache are first stored back to the stack 190 so that the stack 190 is brought up to date, and the registers of the register cache 320 can then be used for other purposes. However, in some instances, such as where the change of instruction set results from the issuance of an interrupt signal, there is not considered sufficient time to perform such a synchronisation step, and accordingly it is essential that the state of the register cache as maintained within the memory 230 of the stack control block 220 is saved for future reference should the instruction flow return to a sequence of Java Card instructions. Accordingly, in preferred embodiments, in such circumstances an operation is issued by the stack control block 220 to the ALU to cause the ALU to store the state of the register cache from the memory 230 into a predetermined register of the register bank 160. This information is then available to the ALU 150 whilst executing other instructions, and can also be copied back to the Java Card decoder unit 100 when the smart card 10 subsequently restarts executing Java Card instructions.

Whilst the preferred embodiment of the present invention has been described with reference to the execution of Java Card instructions, it will be appreciated that embodiments of the present invention could also be applied to other stack-based instruction sets. For example, considering the Java Virtual Machine instruction set, this represents byte, short and int data types as 32 bit values on a 32-bit wide stack, but also has a data item type called "longs" which are 64 bits in length, and stored as two 32-bit stack entries on the stack. If the register bank 160 were to contain 64-bit registers, then it will be appreciated that the techniques of the preferred embodiment of the present invention could also be applied to ensure that long data items can also be stored within a single register, and then at the time of flushing a distinction can be made between long data items and other data items to ensure that the data items are correctly returned to the stack.

It will also be appreciated that whilst the size information is primarily used to enable data items of different size to be stored within registers, and for those data items to then correctly be returned to the stack, that size information can also be used elsewhere within the smart card 10. For example, the ALU 150 could actually make use of that size information during the execution of the operations that it has to perform. For example, in preferred embodiments, the ALU 150 is a 32-bit processor, and always assumes that the 32-bit values that it manipulates from the register bank are actually indicative of 32-bit values. However, when 16-bit values are being manipulated in the 32-bit domain, it is possible to overflow 16 bits (e.g. when adding two 16 bit numbers, a 17-bit result may occur). If, subsequently, an operation was applied that could potentially make the upper 16-bits of the input operands appear within the lower 16-bits of the resultant operand, appropriate steps would need to be taken to ensure that the result would be interpreted correctly in the 16-bit domain. For example, shift right, remainder, divide and compare operations are operations which could make the top-16 bits visible in the lower-16 bits of the result. If the size information was available to the ALU, and indicated that the register values being manipulated were actually indicative of 16-bit values, this information could be used by the ALU to ensure that, for any operations that could potentially make the upper 16-bits of the input operands appear within the lower 16-bits of the resultant operand, appropriate steps were taken to ensure that the result would be interpreted correctly in the 16-bit domain. For example, prior to executing such shift right, remainder, divide and compare operations, a sign extend process could be performed by the ALU on the input operands. Alternatively, after each operation which the size information indicates is being applied to sixteen bit numbers, the result could be sign extended to ensure that it is a 16-bit result before reuse of the result.

As described above, the preferred embodiments of the present invention provide a technique for enabling untyped stack data items to be cached into general purpose registers when using a hardware accelerator tied to a processor to decode stack-based instructions into operations that can be performed by a register-based processor.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

I claim:

1. A data processing apparatus for executing stack-based instructions specifying operations to be executed upon stack data items held in a stack, a first type of stack data item having a first size, and a second type of stack data item having a second size, the data processing apparatus comprising:

a register bank containing a plurality of 'n' bit registers for storing data items, a set of registers within said register bank being allocatable to hold stack data items from a portion of the stack, each register in said set being able to store as an 'n' bit value a stack data item of said first type or a stack data item of said second type;

an arithmetic logic unit for executing operations upon the data items held in said registers;

a decoder for decoding a stack-based instruction to specify a number of operations to be executed by the arithmetic logic unit upon one or more stack data items held in predetermined registers in said set;

a stack controller for controlling the movement of the stack data items between the stack and the set of registers, and responsive to the decoder to cause the one or more stack data items to be held in the predetermined registers;

the stack controller being arranged to cause an indication of the size of each stack data item held in the registers within said set to be maintained, such that when one of those stack data items is moved from the set of registers to the stack, the stack controller can cause that stack data item to be stored on the stack at the size defined by its type.

2. A data processing apparatus as claimed in claim 1, wherein the indication of the size of each stack data item held in registers within said set is stored as a plurality of state bits.

3. A data processing apparatus as claimed in claim 2, wherein the plurality of state bits comprise one bit per register within said set, each bit being arranged to specify whether the corresponding register contains a stack data item of the first type or the second type.

4. A data processing apparatus as claimed in claim 2, further comprising additional state bits indicative of a number of valid stack data items held within said set of registers and indicative of which register within said set holds a top of stack data item.

5. A data processing apparatus as claimed in claim 1, wherein the indication of the size of each stack data item held in registers within said set is maintained by the stack controller within a block of memory.

6. A data processing apparatus as claimed in claim 1, wherein the stack comprises a plurality of addressable stack entries having a fixed size of 'm' bits, the first type of stack data item having a size of 'm' bits, and the second type of stack data item having a size which is a multiple of 'm' bits.

7. A data processing apparatus as claimed in claim 6, wherein the second type of data item has a size of 2m bits.

8. A data processing apparatus as claimed in claim 7, wherein n=2m.

9. A data processing apparatus as claimed in claim 6, wherein m=16.

10. A data processing apparatus as claimed in claim 6, wherein the stack-based instructions are Java Card instructions.

11. A data processing apparatus as claimed in claim 1, wherein the first size is such that each register in said set is able to store a plurality of the first type of stack data items, the stack controller being arranged, for each register in said set that stores a first type data item, to cause an indication of the number of first type data items stored in that register to be maintained.

12. A data processing apparatus as claimed in claim 11, wherein the indication of the number of first type data items held in any register in said set is stored as a plurality of state bits.

13. A data processing apparatus as claimed in claim 11, wherein the stack comprises a plurality of addressable stack entries having a fixed size of 'm' bits, the first type of stack data item having a size of 'm' bits, and the second type of stack data item having a size which is a multiple of 'm' bits.

14. A data processing apparatus as claimed in claim 13, wherein n=2m, and the indication of the number of first type data items stored in a particular register in said set is provided by one or more state bits identifying which halves of said register contain valid data.

15. A data processing apparatus as claimed in claim 1, wherein the stack-based instructions are from a first, stack-based, instruction set, and the data processing apparatus is additionally operable to execute register-based instructions from a second, register-based, instruction set, the data processing apparatus further comprising an additional decoder for decoding a register-based instruction to specify a number of operations to be executed by the arithmetic logic unit upon one or more data items held in predetermined registers of said register bank.

16. A data processing apparatus as claimed in claim 15, wherein the second instruction set includes a swap instruction which when executed causes processing to swap from the second instruction set to the first instruction set, at which time said set of registers within said register bank are allocated to hold stack data items from a portion of the stack.

17. A data processing apparatus as claimed in claim 15, wherein the first instruction set includes a swap instruction which when executed causes processing to swap from the first instruction set to the second instruction set, when instructions of the first instruction set are being executed, the indication of the size of each stack data item held in the registers within said set being stored as a plurality of state bits, and on execution of the swap instruction the stack controller being arranged to cause said plurality of state bits to be stored to a predetermined register within said bank of registers.

18. A data processing apparatus as claimed in claim 1, wherein said set of registers are operable to hold stack data items from a top portion of said stack including a top of stack data item from a top position within said stack.

19. A data processing apparatus as claimed in claim 1, wherein said stack controller is arranged to move a stack data item from said set of registers to the stack if the number of registers within said set that need to be available prior to execution of the number of operations specified by the decoder is more than the number of currently available registers in said set.

20. A data processing apparatus as claimed in claim 1, wherein said decoder comprises one or more of:
hardware decoding logic;
instruction interpreting program code controlling a computer apparatus;
instruction compiling program code controlling a computer apparatus; and
hardware compiling logic.

21. A method of operating a data processing apparatus to execute stack-based instructions specifying operations to be executed upon stack data items held in a stack, a first type of stack data item having a first size, and a second type of stack data item having a second size, the data processing apparatus comprising a register bank containing a plurality of 'n' bit registers for storing data items, a set of registers within said register bank being allocatable to hold stack data items from a portion of the stack, each register in said set being able to store as an 'n' bit value a stack data item of said first type or a stack data item of said second type, and the data processing apparatus further comprising an arithmetic logic unit for executing operations upon the data items held in said registers, the method comprising the steps of:

(i) decoding a stack-based instruction to specify a number of operations to be executed by the arithmetic logic unit upon one or more stack data items held in predetermined registers in said set;

(ii) controlling the movement of the stack data items between the stack and the set of registers, so as to be responsive to said step (i) to cause the one or more stack data items to be held in the predetermined registers;

(iii) maintaining an indication of the size of each stack data item held in the registers within said set, such that if at said step (ii) a stack data item is moved from the set of registers to the stack, that stack data item is stored on the stack at the size defined by its type; and (iv) executing said number of operations specified at said step (i).

22. A method as claimed in claim 21, wherein said step (iii) comprises the step of storing a plurality of state bits indicating the size of the stack data item stored in each register in said set.

23. A method as claimed in claim 22, wherein the plurality of state bits comprise one bit per register within said set, each bit being arranged to specify whether the corresponding register contains a stack data item of the first type or the second type.

24. A method as claimed in claim 22, further comprising the step of storing additional state bits indicative of a number of valid stack data items held within said set of registers and indicative of which register within said set holds a top of stack data item.

25. A method as claimed in claim 21, wherein the indication of the size of each stack data item held in registers within said set is maintained by the stack controller within a block of memory.

26. A method as claimed in claim 21, wherein the stack comprises a plurality of addressable stack entries having a fixed size of 'm' bits, the first type of stack data item having a size of 'm' bits, and the second type of stack data item having a size which is a multiple of 'm' bits.

27. A method as claimed in claim 26, wherein the second type of data item has a size of 2m bits.

28. A method as claimed in claim 27, wherein n=2m.

29. A method as claimed in claim 26, wherein m=16.

30. A method as claimed in claim 26, wherein the stack-based instructions are Java Card instructions.

31. A method as claimed in claim 21, wherein the first size is such that each register in said set is able to store a plurality of the first type of stack data items, the method further comprising the step of, for each register in said set that stores a first type data item, maintaining an indication of the number of first type data items stored in that register.

32. A method as claimed in claim 31, wherein the indication of the number of first type data items held in any register in said set is stored as a plurality of state bits.

33. A method as claimed in claim 31, wherein the stack comprises a plurality of addressable stack entries having a fixed size of 'm' bits, the first type of stack data item having a size of 'm' bits, and the second type of stack data item having a size which is a multiple of 'm' bits.

34. A method as claimed in claim 33, wherein n=2m, and the indication of the number of first type data items stored in a particular register in said set is provided by one or more state bits identifying which halves of said register contain valid data.

35. A method as claimed in claim 21, wherein the stack-based instructions are from a first, stack-based, instruction set, and the data processing apparatus is additionally operable to execute register-based instructions from a second, register-based, instruction set, the method further comprising the step of decoding a register-based instruction to specify a number of operations to be executed by the arithmetic logic unit upon one or more data items held in predetermined registers of said register bank.

36. A method as claimed in claim 35, wherein the second instruction set includes a swap instruction which when executed causes processing to swap from the second instruction set to the first instruction set, at which time the method further comprises the step of allocating said set of registers within said register bank to hold stack data items from a portion of the stack.

37. A method as claimed in claim 35, wherein the first instruction set includes a swap instruction which when executed causes processing to swap from the first instruction set to the second instruction set, when instructions of the first instruction set are being executed, the indication of the size of each stack data item held in the registers within said set being stored as a plurality of state bits, and on execution of the swap instruction the method further comprising the step of storing said plurality of state bits to a predetermined register within said bank of registers.

38. A method as claimed in claim 21, wherein said set of registers are operable to hold stack data items from a top portion of said stack including a top of stack data item from a top position within said stack.

39. A method as claimed in claim 21, wherein at said step (ii) a stack data item is moved from said set of registers to the stack if the number of registers within said set that need to be available prior to execution of the number of operations specified by the decoder is more than the number of currently available registers in said set.

40. A computer program product carrying a computer program for controlling a computer to perform the method of claim 21.

* * * * *